United States Patent
Cope

[11] 3,898,737
[45] Aug. 12, 1975

[54] DENTAL SPIGOT CONTROL DEVICE

[76] Inventor: Raymond Cope, 3541 Springvalley Rd., Birmingham, Ala. 35223

[22] Filed: July 30, 1973

[21] Appl. No.: 383,978

[52] U.S. Cl. .................................................. 32/22
[51] Int. Cl.² ....................................... A61C 19/02
[58] Field of Search ............. 32/22, 1; 239/29.5, 29; 4/263, 264, 265

[56] References Cited
UNITED STATES PATENTS

| | | | |
|---|---|---|---|
| 1,525,425 | 2/1925 | Mueller | 239/29.5 |
| 1,952,364 | 3/1934 | Carpita | 239/29.5 |
| 2,914,252 | 11/1959 | Sorgnsen et al. | 239/29.5 |
| 3,554,446 | 1/1971 | Castillo | 239/29.5 |
| 3,653,078 | 4/1972 | Buchtel et al. | 4/263 |

*Primary Examiner*—Louis G. Mancene
*Assistant Examiner*—J. O. Lever

[57] ABSTRACT

In a preferred embodiment, a dental spigot structure which includes hot and cold water separate inlet pipes connected to a mixer valve which has a long control arm for regulating the proportion of hot and cold water relative to one-another mixed therein, and an outlet conduit therefrom leading to a flow control valve and to a bypass valve, and conduits from each of the flow control valve and the bypass valve, and joining into a common outlet spigot conduit having an outlet at an end thereof for an exiting of fluid flow from either of the flow control valve and the bypass valve, with the bypass valve being manually controllable and with the flow control valve a compressed air operated diaphragm valve the operation of which avoids water-thump and produces an evenly controlled flow of water from the spigot outlet, and there being included an air pilot valve with a switch therefor including a knee-controlled pivoted-pad element mounted such that minor pressure on the knee pad serves to actuate the air pilot valve and release of pressure thereon serves to deactuate the air pilot valve, and the air pilot valve including an inlet conduit connected to a compressed air input source, and has an outlet conduit from the pilot valve to the flow control valve for operation thereof. By use of the elongated mixer valve lever, presetting of temperature is possible and additionally temperature is intermittently adjustable by use of the elbow of a person, and additionally also the diaphragm valve serves to give an even and noiseless flow of water, this being very important in the dental field particularly in the presence of a dental patient where it is desirable to avoid unnecessary irritating noises and disturbances, but equally important the dentist being able to maintain sanitation of his hands by avoiding touching the valves with his hands but yet having complete control and use of the spigot controls while avoiding contamination of his hands.

7 Claims, 1 Drawing Figure

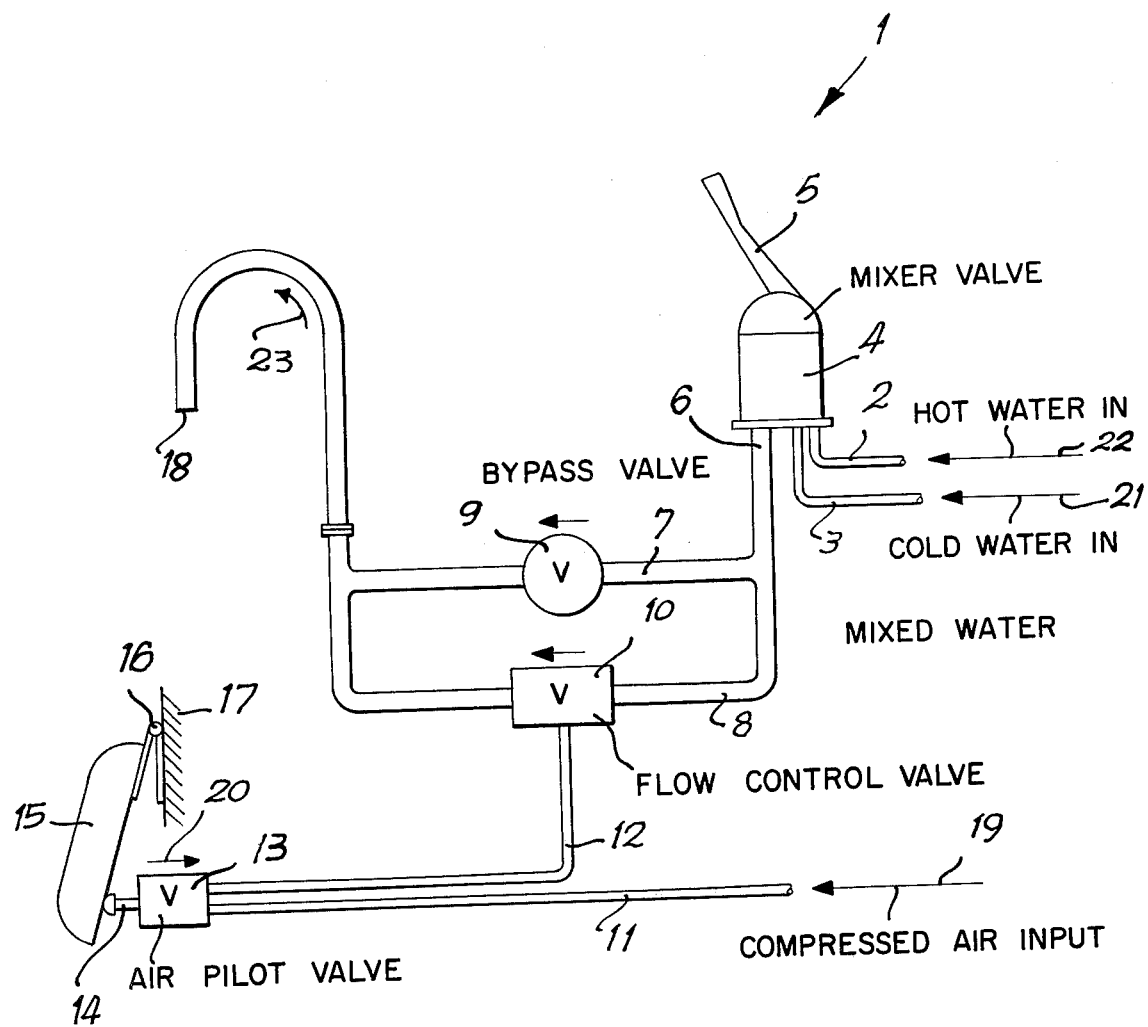

DENTAL SPIGOT CONTROL DEVICE

This invention relates to a dental spigot device having novel advantages.

BACKGROUND OF THE INVENTION

Prior to the present invention, there have existed various flow control devices for water going to and through dental spigots, but which devices include inherent disadvantages and problems. It is always desirable to avoid the use of electricity where possible where there is any moisture or water involved, and accordingly it is desirable to avoid the use of electrically activated solenoids which are typically used in flow-control systems of the type to which the present invention is directed. Additionally, it is aesthetically unpleasing to have a water control system in the vicinity of a dental patient where each time the water is turned off and on there is a characteristic water-thump noise caused by the force of the water against the valve control mechanism. But more importantly, it is important in the practice of mental hygiene that when the dentist's or dental surgeon's hands are in a sanitary uncontaminated state, that he be able to proceed with due speed but with easy control over the temperature of and the flow of spigot water without the problem of contamination of his hands by having to grasp the various valve control levers. At the same time, it is desirable that there not be obstructions distributed around the floor or other areas which might impede the movement of the dentist in going about his duties of serving the patient or operating (procedures) with regard to the maneuvering space around the patient, such as undesirable floor devices, pedals, and the like, where in fact the dentist could stumble or be caused to lose his equilibrium and injure the patient with an operating drill or the like.

SUMMARY OF THE INVENTION

Accordingly, objects of the present invention include the overcoming of and/or avoiding of one or more difficulties or disadvantages of the types discussed above.

Other objects include the obtaining of new and desirable advantages not heretofore available.

Another object is to obtain a system in which there may be avoided the undesirable water-thump noise which could otherwise make a dental patient more nervous during dental procedures.

Another object is to obtain an overall mechanism whereby a dentist may avoid contamination of his hands while maintaining complete control of temperature and/or flow of water from a dental spigot.

Another object includes means for continued operation in the event of mechanical failure of the intended operative semi-automatic mechanism of the present system.

Other objects become apparent from the preceding and following disclosure.

One or more objects of the present invention are obtained by the invention as described herein.

Broadly the invention includes there being present a compressed air source and a conduit connected or connectable thereto, leading to a pilot valve, preferably an air pilot valve where compressed air is the source of pressure in a preferred embodiment, and leading from the air pilot valve a conduit connected to a water-flow control valve, preferably of a diaphragm type which avoids a water-thump noise, and passing through the flow-control valve there being inlet and outlet conduits from the water source and to a spigot outlet, and the inlet conduit preferably being connected through mixer-valve mechanism which mixer-valve mechanism includes an elongated manually operable lever of a pivoted type which elongated lever is pivotably maneuverable by virtue of its long extension by use of the dentist's elbow or wrist or such without the necessity of touching the lever with his sterile hands, the mixer-valve mechanism having inlets of both hot and cold water and a ratio valve for adjusting the relative amounts of water passing to the flow control valve from each respectively of the hot and cold water inlets. There is conducted from the mixer mechanism a bypass conduit in parallel with the flow-control valve, which bypass conduit includes a bypass valve manually operable for continued operation by the dentist in the event of the failure of the flow control valve and/or of the pilot valve and/or of the compressed air source.

THE FIGURE

The FIGURE is a diagrammatic illustration of the dental flow system of the present invention showing each of the elements discussed above.

DETAILED DESCRIPTION OF THE INVENTION

Broadly the invention includes a semiautomatically controlled dental spigot including preferably a knee pad 15 pivot on a hinge 16 for activating a lever 14 axially movably to control the on and off and degrees of on-and-off of the air pilot valve 13 upon movement of the pad 15 in direction 20 to activate or in reverse direction when pressure on the pad 15 is diminished or released. The hot and cold water that is furnished through the respective conduits 2 and 3 to the mixer valve 4 having the valve control pivoted lever 5 having an elongated shape and the mixer valve conduit outlet 6 leading respectively to the conduit 8 and the bypass conduit 7 with the flow-control valve 10 and the bypass valve 9 each respectively leading to a common spigot outlet 18 for the flow of water in direction 23. Upon entry of compressed air in direction 19, and activation of the switch 13, the pressure is passed through conduit 12 to the flow control valve 10 which is preferably of a diaphragm type as discussed above which avoids a water-thump noise. The hinge member pivotably at 16 is mounted preferably on a side of the dental chair or other convenient or desirable place where the dentist's knee would be able to conveniently press against the pad 15 controllably.

It is to be understood that although the sole control valve mention is a diaphragm valve as preferred, other types of valves may be utilized within the inventive combination otherwise. Similarly, although the pilot valve is an air-controlled pilot valve, other types of valves may be utilized, and other liquids and/or fluids other than air may be employed, under pressure.

However, for the marked and significant improved operation and advantages of the invention, the noted preferred embodiments are to be utilized.

Additionally, it should be noted that a primary element in the heart of the present invention is the use of the combination of the air pilot switch and knee lever in combination with the diaphragm valve operated by the air pressure controlled thereby.

Accordingly, it is to be understood that various modifications and substitutions of equivalents are within the scope of the present invention, the particular elements and means illustrated being for the purpose of improving the ease and understanding of the heart of the invention as disclosed, and that it is accordingly within the spirit and scope of the present invention to make these variations and modifications as would be apparent to a person having ordinary skill in this particular field of endeavor.

I claim:

1. A dental spigot device comprising in combination: a water conduit means including at least one water-receiving conduit and in series therewith a flow control valve and a water outlet, fluid control means for controllably preventing outflow of water from said outlet, and fluid switch means for turning off and on fluid to said fluid control means, said fluid control means being responsive to fluid turned off and on by said fluid switch means, said fluid switch means including respective conduits receivable of pressurized fluid and operatively connecting the fluid switch thereof to the fluid control means, and said fluid switch means further including manual actuation lever therefor, and in series between the water-receiving conduit and the flow control means, there being a mixer valve means receivable of conduits for each of hot and cold water delivery separately thereto, with a unitary outlet to the flow control means.

2. A dental spigot device of claim 1, in which the manual actuation lever includes hinge element and a knee actuatable pad member mounted on the hinge element such that upon pressure being exerted against the pad member by a knee of a person the fluid switch means activates and upon reversing the motion of the pad member on the hinge element, the fluid switch means deactivates.

3. A dental spigot device of claim 2, and bypass valve means for manually bypassing said fluid control valve.

4. A dental spigot device of claim 1, in which the mixer valve means includes an elongated pivoted arm projecting outwardly from the body of the mixer valve means such that an arm or wrist may regulate the same.

5. A dental spigot device of claim 4, in which said switch means is an air pilot valve, in which said flow control means valve controls fluid flow and in which the fluid switch means includes an axially movable actuation shaft a distal end of which is positioned for receiving pressure of hinged pad member.

6. A dental spigot device of claim 5, in which said flow control means valve is a diaphragm flow control valve.

7. A dental spigot device of claim 1, in which said flow control means valve is a diaphragm flow control valve.

* * * * *